(12) United States Patent
Pericas et al.

(10) Patent No.: US 7,644,038 B2
(45) Date of Patent: Jan. 5, 2010

(54) INTEGRATED WIRELESS AND WIRELINE BILLING AND SERVICES MANAGEMENT

(75) Inventors: Zaida Pericas, Atlanta, GA (US); Eric B. Wolbach, Lawrenceville, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 796 days.

(21) Appl. No.: 10/655,558

(22) Filed: Sep. 4, 2003

(65) Prior Publication Data

US 2004/0224661 A1    Nov. 11, 2004

Related U.S. Application Data

(60) Provisional application No. 60/451,125, filed on Feb. 28, 2003.

(51) Int. Cl.
*G06Q 40/00* (2006.01)
(52) U.S. Cl. .......................................... 705/40
(58) Field of Classification Search ............ 705/40
See application file for complete search history.

(56) References Cited

U.S. PATENT DOCUMENTS

| | | | | |
|---|---|---|---|---|
| 5,483,445 A | * | 1/1996 | Pickering | 705/40 |
| 5,771,282 A | * | 6/1998 | Friedes | 379/121.03 |
| 5,915,006 A | * | 6/1999 | Jagadish et al. | 379/115.01 |
| 6,337,901 B1 | * | 1/2002 | Rome et al. | 379/112.01 |
| 6,535,593 B1 | * | 3/2003 | Cashiola | 379/121.01 |
| 7,046,988 B2 | * | 5/2006 | Kotzin | 455/406 |
| 7,236,950 B2 | * | 6/2007 | Savage et al. | 705/34 |
| 2001/0056362 A1 | * | 12/2001 | Hanagan et al. | 705/7 |
| 2004/0133487 A1 | * | 7/2004 | Hanagan et al. | 705/34 |

OTHER PUBLICATIONS

Swett, Clint, "Cingular Offers Rollover Minutes," Aug. 20, 2002, Knight Rider Tribune Business News.*

* cited by examiner

*Primary Examiner*—James Kramer
*Assistant Examiner*—Lindsay M. Maguire

(57) ABSTRACT

Methods and systems are provided for integrating billing and services management systems across disparate telecommunications systems including wireless systems and local and long distance wireline systems. Wireless and wireline services may be charged to and billed under one periodic billing. A rollover management system is employed for managing units of call usage that may be "rolled over" from a present usage period to a subsequent usage period. An integrated services settlement system is provided which is operable for apportioning revenue associated with utilization of the wireless carrier's services to the wireless carrier and for apportioning revenue associated with the wireline carrier's services to the wireline carrier. An integrated telecommunications services ordering system is provided that is operable to synchronize subscriber orders between the subscriber's wireless and wireline carriers.

22 Claims, 4 Drawing Sheets

INTEGRATED WIRELESS AND WIRELINE BILLING AND SERVICES MANAGEMENT

CROSS REFERENCE TO RELATED APPLICATIONS

The present application claims priority from U.S. provisional application No. 60/451,125 entitled "Wireline and Wireless Telephone Service Plan Method and System Including Wireless Minutes Sharing Between Wireless and Wireline Telephones," filed Feb. 28, 2003, said application incorporated herein by reference.

FIELD OF INVENTION

The present invention relates generally to billing systems for telecommunications services. More particularly, the present invention relates to integrating billing management functionality for wireless and wireline telecommunications services.

BACKGROUND OF INVENTION

Many telecommunications services are typically billed on a per event basis or on a per unit time basis. Long distance wireline and some local wireline services typically are charged and billed at a cost per unit time, such as ten cents per minute. Similarly, many wireless telecommunications services are charged at a cost per unit time basis. A common practice among wireless carriers is to offer a set number of minutes of calling during a given period at a given cost. For example, one calling plan may provide a user 800 minutes of wireless calling time per month for $50.00. Some plans allow users to "rollover" unused minutes to a subsequent usage period. Other plans allow users free calls during off-peak periods such as weekends and evenings.

Because of the widespread availability of wireless services, many users have begun to use their wireless telephones for certain services such as long distance services in order to take advantage of unused minutes of service, or where the cost associated with the wireless service is less expensive then the cost associated with the wireline long distance or local service.

Unfortunately, utilizing two separate telephone systems is less than efficient on a number of different levels. Users receive separate monthly bills for the wireless and wireline services. Users must contact two separate carriers for services ordering and/or changes. Users receive correspondence from two separate carriers. Additionally, wireless telephone reception varies depending on the location of transmitter/receiver sites and depending on the location of the user (indoors, outdoors, etc.). If a user is attempting to use her wireless telephone in order to avoid use of her wireline long distance service, she may literally have to chase a good wireless signal during her wireless communication.

Accordingly, there is a need for an integrated telecommunications billing and services management system that integrates billing management across disparate telecommunications services systems. It is with respect to these and other considerations that the present invention has been made.

SUMMARY OF THE INVENTION

Embodiments of the present invention provide methods and systems for integrating billing management systems across disparate telecommunications systems including wireless systems and local and long distance wireline systems.

Generally, according to one aspect of the invention call data records for one services system are forwarded to a call data record rating platform for determining billing information associated with each of the call data records. Call data records for a different services system are forwarded to the same or to a separate call data record rating platform for determining billing information associated with each of the call data records for the different services system. Billing information for each call data records associated with the multiple services systems is forwarded from the one or more call data record rating platforms to a billing system where a single periodic billing may be generated for the call data records from the different services systems.

More particularly, according to one aspect of the invention, a subscriber to the wireless telecommunications services of a wireless carrier and to the local and long distance wireline services of a wireline carrier may obtain a single calling plan that allows the subscriber to utilize both wireless and wireline services under one periodic billing. According to this aspect, units of calling usage, for example 800 units per month, may be shared for use of the caller's wireless and local and long distance wireline services. When wireless calls are transacted by the subscriber, call data records (CDR) for those calls are forwarded by the subscriber's wireless carrier to a call data record rating platform of the subscriber's wireline carrier. At the call data record rating platform, each wireless call is rated to determine whether or not the call is to be charged and at what cost. Call data records for the subscriber's local and long distance wireline calls are also forwarded to the call data record rating platform of the wireline carrier. Once all call data records for both the wireless calls and wireline local and long distance calls have been rated at the call data record rating platform, data associated with the rated calls is passed to a billing system of the wireline carrier. At the billing system, the wireline carrier produces a single bill for both wireless and wireline services that may be sent to the subscriber for payment.

According to another aspect of the invention, a method of integrating billing management between a plurality of telecommunications services systems includes receiving first call data records (CDR) associated with calls transacted via a first services system and receiving second CDRs associated with calls transacted via a second services system. The first CDRs and the second CDRs are routed to one or more CDR rating platforms. At the one or more CDR rating platforms, billing information associated with each of the first and second CDRs is determined. The billing information associated with each of the first and second CDRs is routed to a billing system. At the billing system a single periodic bill is prepared showing charges associated with the first and second CDRs. Routing the first CDRs and the second CDRs to one or more CDR rating platforms may include routing the first CDRs to a first CDR rating platform and routing the second CDRs to a second CDR rating platform. Alternatively, routing the first CDRs and the second CDRs to one or more CDR rating platforms includes routing the first CDRs and the second CDRs to a single CDR rating platform at one of the first or second services systems.

According to another aspect of the present invention, a rollover management system is employed for managing units of call usage that may be "rolled over" from a present usage period to a subsequent usage period according to the subscriber's calling plan. Usage data is forwarded to the rollover management system from both the subscriber's wireline and wireless carriers. A rollover matrix is prepared showing the number of units of call usage that are available for rolling over to a subsequent usage period. For example, a rollover matrix may illustrate the number of rollover minutes available to a particular subscriber on a month-to-month basis over the course of one full year. The rollover matrix is provided by the rollover management system to both the wireline and wireless carriers to assist in accounting associated with rollover minutes calling plans. Additionally, the rollover matrix allows for the publication of call units availability, such as plan anytime minutes, rollover, night and weekend minutes and mobile-to-mobile minutes to an Internet-based web page for review by the subscriber. Or the call units availability information may be published to a sales and service system(s) for view by the sales/customer support personnel to allow them to answer customer questions regarding unbilled call units. The rollover management system is further operative to account for and publish unbilled services usage for review by subscribers.

According to another aspect of the present invention, an integrated services settlement system is provided which is operable for apportioning revenue associated with utilization of the wireless carrier's services to the wireless carrier and for apportioning revenue associated with the wireline carrier's services to the wireline carrier. According to another aspect of the invention, an integrated telecommunications services ordering system is provided that is operable to synchronize subscriber orders between the subscriber's wireless and wireline carriers. According to another aspect of the invention, integrated wireless and wireline fulfillment notifications notifying a subscriber of changes in services provided to the subscriber in response to subscriber initiated services ordering or changes or in response to carrier initiated services changes are provided.

These and other features and advantages, which characterize the present invention, will be apparent from a reading of the following detailed description and a review of the associated drawings. It is to be understood that both the foregoing general description and the following detail description are exemplary and explanatory only and are not restrictive of the invention as claimed.

DETAILED DESCRIPTION

As described briefly above, embodiments of the present invention are directed to systems and methods for integrating billing and services management services across disparate telecommunications services systems including wireless systems and local and long distance wireline systems. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

The description that follows describes embodiments of the present invention in terms of integrated billing and services management between a wireless communications carrier and a wireline communications carrier. It should be understood, however, that the scope of the present invention is not limited to integration of billing and services management of wireless and wireline services systems. Embodiments of the present invention are equally operable for integrating billing and services management between a number of different types of services providers who offer integrated services to their subscribers. For example, embodiments of the present invention may be utilized by two different wireline services providers, or between two different wireless providers, or between a wireline services provider and an Internet services provider, or between a wireless services provider and an Internet services provider, or between a wireline or wireless services provider and an instant messaging services provider and many other combinations of the above. Likewise, the description that follows describes integrated billing management for wireless calls and wireline local and long distance calls. It should be understood that embodiments of the present invention are equally operable to manage all types of call or messaging transactions requiring billing management. For example embodiments of the present invention are operable to manage billing associated with wireless local and long distance calls, wireline local and long distance calls, instant messaging calls, pages and Internet-based communications.

Figure 1:
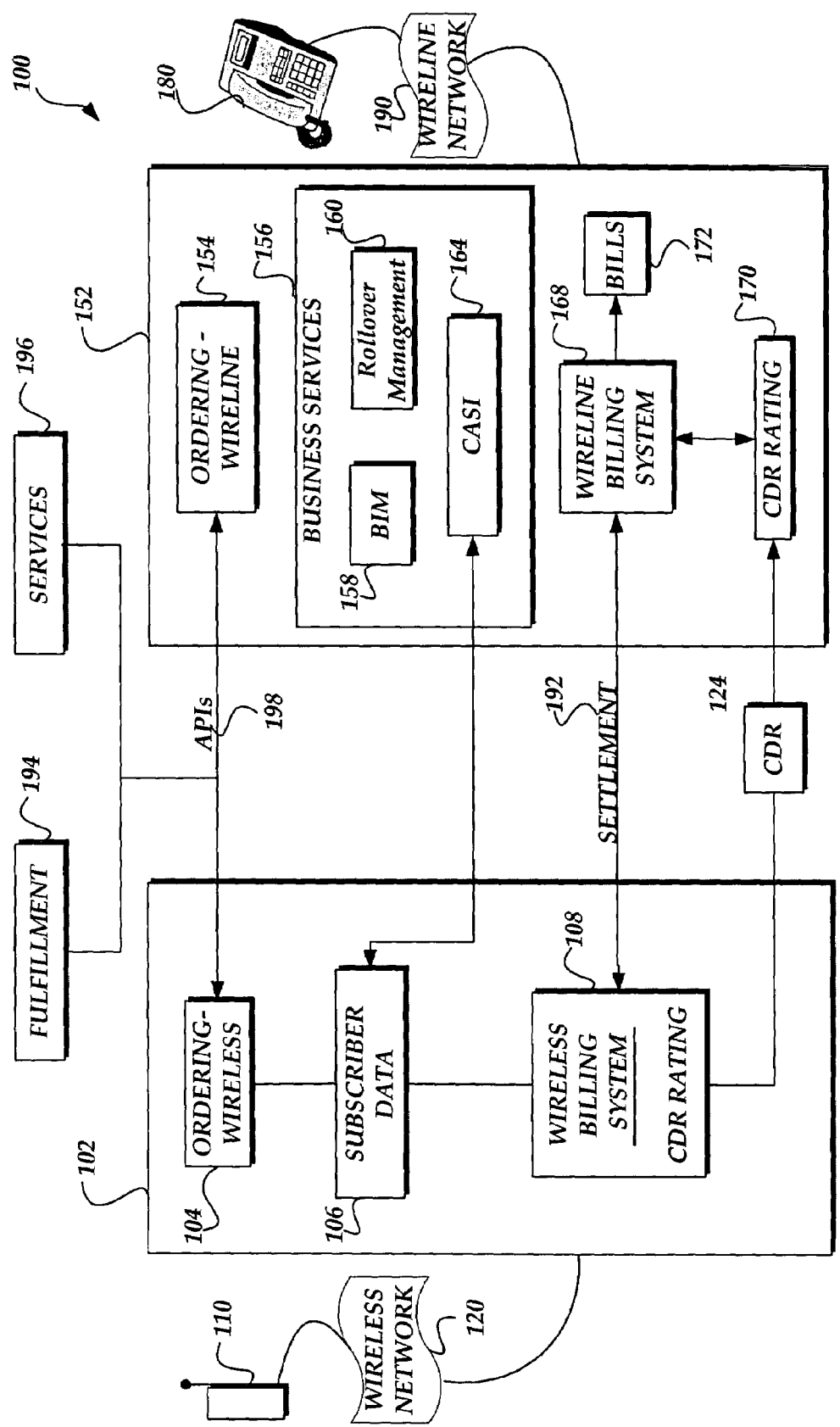
FIG. 1 is a simplified block diagram showing interaction between a wireless carrier and a wireline carrier for providing integrated billing management according to embodiments of the present invention.

FIG. 1 is a simplified block diagram illustrating a system architecture and environment for one embodiment of the present invention. In particular, FIG. 1 shows interaction between a wireless carrier and a wireline carrier for providing integrated billing and services management according to embodiments of the present invention. According to embodiments of the present invention a wireless telecommunications services provider (wireless carrier) 102 is illustrated for providing wireless telecommunications services via a wireless network 120. As should be appreciated by those skilled in the art, the wireless network 120 is illustrative of conventional cellular telecommunications networks and other wireless telecommunications operating systems such as satellite-based wireless telecommunications systems, ultra wideband wireless telecommunications, low and medium range wireless telecommunications such as wireless fidelity (WIFI) systems and the like. The wireless carrier 102 includes a wireless billing system/call data record rating system 108, a subscriber data system 106 and a wireless ordering system 104.

According to embodiments of the present invention, a wireless billing system/call data record (CDR) rating system 108 may include one or more general purpose computing systems, memory and software application programs operative to receive call data record information associated with wireless telephone calls operated via the wireless carrier 102 and to prepare periodic billing for wireless telecommunications services associated with wireless services call data records. That is, when a wireless communication is sent or received via the wireless carrier 102, a call data record associated with the wireless communication is received at the wireless billing system/call data rating system 108 of the wireless carrier 102 and is processed to determine whether or not a charge is associated with the call data record. On a periodic basis, for example monthly, the billing system 108 of the wireless carrier 102 generates a bill to subscribers of the wireless carrier 102 including charges for basic wireless services subscribed to by the subscriber and charges associated with individual calls, if required.

The subscriber data system 106 includes general purpose computing systems, memory, and software application programs operative to receive, store and aggregate subscriber data including subscriber personal and contact information, subscriber billing information, subscriber services, subscriber credit information and the like. The wireless ordering system 104 is operative to receive and process wireless services orders and services changes from subscribers of the services of the wireless carrier 102.

According to embodiments of the present invention, a wireline services carrier (wireline carrier) 152 is illustrated for providing local and long distance wireline services via the wireline network 190. As should be appreciated by those skilled in the art, the wireline carrier 152 may operate a variety of wireline and digital data network telecommunications services including conventional local and long distance wireline telephone services, Internet access services, digital data networks, wireline distributed computing networks, and the like.

Referring to the wireline carrier 152, a call data record (CDR) rating platform 170 is provided for rating individual call data records associated with telecommunications services events such as telephone calls made via the wireline carrier 152. As will be described in detail below, the CDR rating platform 170 of the present invention is also operative to rate wireless telephone calls made via the wireless carrier 102. A wireline billing system 168 is provided which performs similar functions as the wireless billing system 108 described above with reference to the wireless carrier 102. As wireline local and long distance telephone calls are made via the wireline carrier 152, call data records associated with those telephone calls are rated by the CDR rating platform 170 to determine whether or not billing is associated with a given CDR in association with a given telephone call.

Data from the CDR rating platform 170 is forwarded to the wireline billing system 168 that prepares billing associated with telephone calls made via the wireline carrier 152 during a given period, for example monthly. Other billing requirements such as state, local and federal taxation are also applied by the wireline billing system 168 in order to generate bills 172. According to embodiments of the present invention, bills 172 generated by the wireline billing system 168 and bills generated by the wireless billing system 108 may be in the form of conventional paper bills mailed to subscribers on a periodic basis, or may be in the form of electronic bills that are published to an Internet-based website accessible by subscribers.

Referring still to the wireline carrier 152, a business services platform 156 is provided. The business services platform 156 includes a rollover management system 160. As will be described below with reference to FIG. 3, the rollover management system 160 includes general purpose computing capability and software program applications operative to manage units of telecommunications services usage, such as (minutes of calling time) that may be "rolled over" from one billing period to a subsequent billing period.

Referring still to the business services platform 156, a bundle integrity manager (BIM) 158 is illustrated. The bundle integrity manager includes general purpose computing processing functionality, memory and software application programming operative to synchronize telecommunications services affecting both the wireless carrier 102 and the wireline carrier 152. For example, as will be described in detail below, according to embodiments of the present invention, services orders or changes placed through either the wireless ordering platform 104 or the wireline ordering platform 154 may be processed through the bundle integrity manager to ensure that services changes or updates made through the ordering platform of one of the wireless or wireline carriers 102, 152 are synchronized with services provided by the other of the wireless or wireline carrier 102, 152 according to embodiments of the present invention. A customer affiliate subscriber information (CASI) database 164 is provided for maintaining subscriber data associated with subscribers utilizing integrated services of the wireless carrier 102 and the wireline carrier 152 according to embodiments of the present invention.

The wireline ordering platform 154 performs similar functions for the wireline carrier 152 as described for the wireless ordering platform 104. That is, subscriber services orders and changes may be processed through the wireline ordering platform 154 to change or otherwise update services provided to a subscriber via the wireline carrier 152. As should be understood, services orders processed by the either the wireless ordering platform 104 or the wireline ordering platform 154 may include any of a number of services ordered or changed by the subscriber. For example, a services order processed by one of the ordering platforms 104, 154 may include a subscriber order for a wireless/wireline minute sharing plan.

According to embodiments of the present invention, a set of application programming interfaces (API) 198 are provided for allowing synchronization between the wireless ordering platform 104 and the wireline ordering platform 154. That is, if a subscriber places an order via the wireless ordering platform 102 that affects services provided by the wireline carrier 152, the APIs 198 allow for data calls between the computing systems and databases of the wireless ordering platform 104 and the wireline ordering platform 154 to ensure that services orders, services changes or other updates made through the wireless ordering platform 104 are passed through to the wireline ordering platform 154 as if those changes were made through the wireline ordering platform in the first instance. Conversely, services orders or changes made through the wireline ordering platform 154 are passed through to the wireless ordering platform 104 via the API's 198 to ensure that services ordering or other changes and/or updates are passed from the wireline ordering platform to the wireless ordering platform 104 when those services changes or updates affect services provided to a given subscriber via the wireless carrier 102.

A settlement component 192 is illustrated between the wireless billing system 108 and the wireline billing system 168. According to embodiments of the present invention, the settlement component 192 includes software programming operative to process periodic revenue associated with integrated wireless and wireline billing in order to apportion revenue associated with wireless services during a given period of integrated services usage to the wireless carrier 102 and to apportion revenue associated with wireline services during the same period of integrated services usage to the wireline carrier 152. The fulfillment block 194 and the services block 196 are illustrative of additional integrated services provided in accordance with embodiments of the present invention. If integrated services according to embodiments of the present invention are ordered or changed via the wireless ordering platform 104 or the wireline ordering platform 154, synchronized fulfillment notification notifying the subscriber of the changes in services are provided to the subscriber rather than having the subscriber receive notifications from each of the wireless carrier 102 and wireline carrier 152. Likewise, services information made available to subscribers regarding their available services and services options may be synchronized through a single services platform 196 for integrated services provided according to embodiments of the present invention.

As described above with reference to FIG. 1, embodiments of the present invention allow for sharing of call usage resources between the services of different services providers, such as the wireless carrier 102 and the wireline carrier 152. Also, as described above with reference to FIG. 1, embodiments of the present invention allow for other integrated services including integrated ordering services, integrated fulfillment services, and integrated services inquiry and information services. A description of call services usage sharing (minutes sharing) is described below with reference to FIGS. 3 and 4. It is advantageous at this point to describe the functionality of other integrated services according to embodiments of the present invention including integrated ordering services, subscriber data maintenance, integrated fulfillment and integrated services inquiry.

Figure 2:
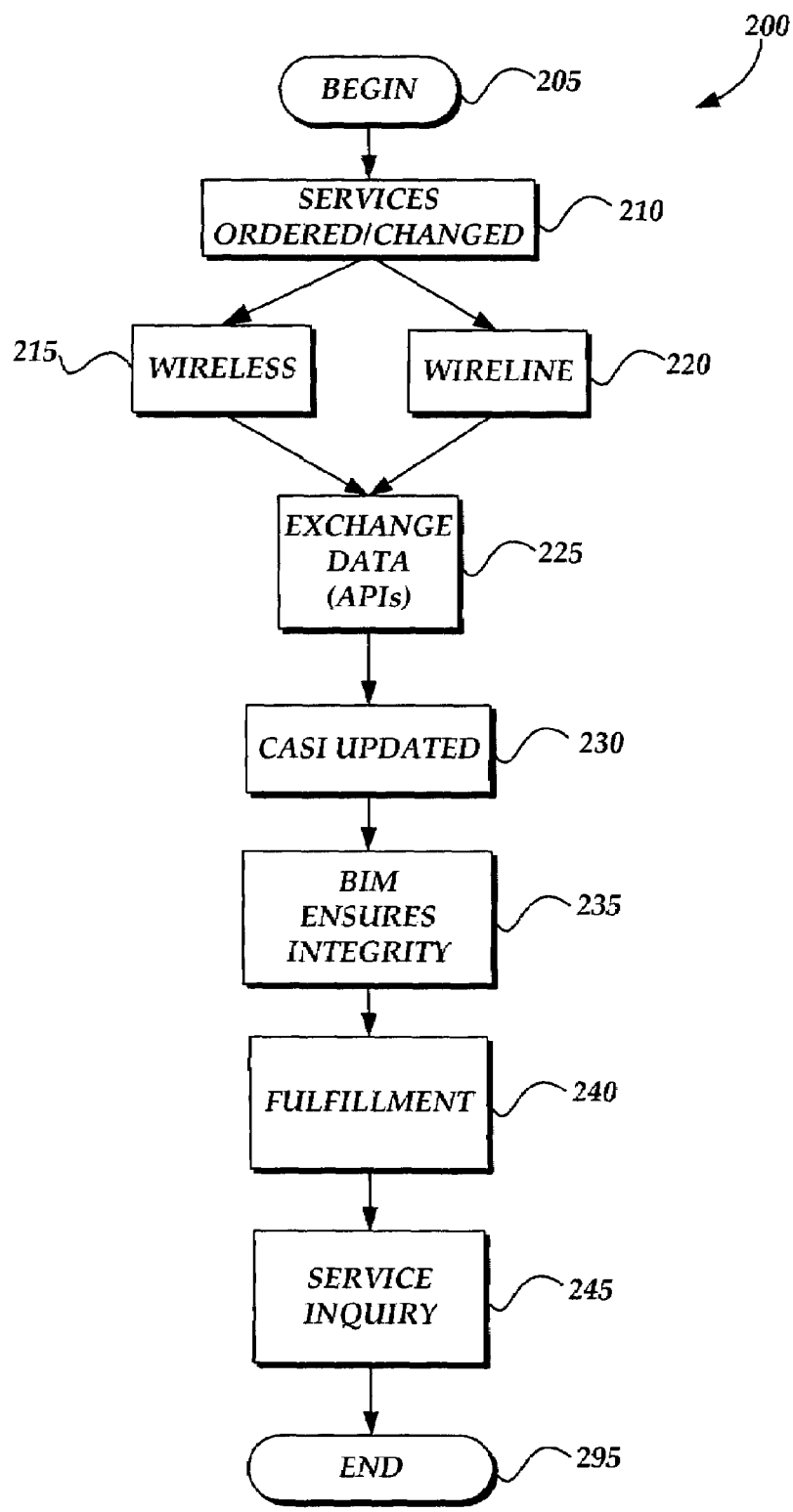
FIG. 2 is a flow diagram showing an illustrative routine for integrating billing management features across disparate telecommunications services systems.

FIG. 2 is a flow diagram showing an illustrative routine for integrating billing management features across disparate telecommunications services systems. The method 200 begins at start block 205 and proceeds to block 210 where telecommunications services may be ordered via the wireless ordering platform 104 of the wireless carrier 102 or via the wireline ordering platform 154 of the wireline carrier 152. For example, consider for the description of the routine illustrated in FIG. 2 that a subscriber of wireless telecommunications services via the wireless carrier 102 contacts the wireless carrier 102 via the wireless ordering platform 104 to subscribe to a minute sharing plan whereby the subscriber will order a set number of minutes of usage of her wireless telecommunications services during a usage period such as a month. According to the plan requested by the subscriber, and according to embodiments of the present invention, the minute sharing plan will allow the subscriber to utilize the local and long distance services of the wireline carrier 152 by applying usage of the wireline local and long distance services of the wireline carrier 152 to the subscriber's wireless calling plan. For example, consider that the subscriber requests a calling plan giving the subscriber 1000 anytime minutes of wireless services per month.

According to the minute sharing plan subscribed to by the subscriber, all long distance telephone calls made through he wireline carrier 152 and any applicable local wireline telephone calls (local calls associated with a charge) are taxed against the 1000 anytime minutes per month ordered by the subscriber through her wireless carrier 102. That is, if the subscriber uses her wireline long distance services through the wireline carrier 300 minutes in a given month, those 300 minutes of usage will be subtracted from the 1000 minutes per month ordered by the subscriber through her wireless carrier 102. On the other hand, the subscriber may contact her wireline carrier 152 via the wireline ordering platform 154 to request the same minute sharing plan from her wireline carrier 152 whereby the subscriber request that usage of her wireless telecommunications services through her wireline carrier 102 be taxed against the services she orders from the wireline carrier 152.

At block 225, as briefly described above with reference to FIG. 1, services ordering or services change data received at the wireless ordering platform 104 from the subscriber is passed through to the wireline ordering platform 154 of the wireline carrier 152 via data calls promulgated by the API's 198 for passing data between the wireless ordering platform 104 and the wireline ordering platform 154. Conversely, data associated with services orders or services changes made via the wireline ordering platform 154 by a subscriber through the wireline carrier 152 are passed through to the wireless ordering platform 104 of the wireless carrier 102 through the API's 198. Such passage of services ordering and services update information between the ordering platforms of the wireless carrier 102 and the wireline carrier 152 ensures that both carriers have like information associated with telecommunications services requiring the involvement of both carriers. For example, following from the example given above, if the subscriber makes changes to her wireless services plan that must be honored or processed by the services of the wireline carrier 152, exchange of ordering and services update information between the two carriers is essential to integrating the billing management system according to embodiments of the present invention.

At block 230, the subscriber data system 106 of the wireless carrier 102 receives updated data for the subscriber associated with the services orders or changes made by the subscriber at block 210. Likewise, if the subscriber makes services changes through the wireline carrier 152, subscriber data is updated in the customer affiliate subscriber information database 164 in the businesses services platform 156. According to embodiments of the present invention, on a periodic basis, for example nightly, subscriber data from the wireless carrier subscriber data system 106 associated with subscribers to integrated wireless and wireline services described herein is transmitted from the wireless carrier 102 to the customer affiliate subscriber information database (CASI) 164. Subsequently, if other services changes are made at either the wireless carrier 102 via the wireless ordering platform 104 or the wireline carrier 152 via the wireline ordering platform 154, those subsequent changes are also passed through to the CASI 164. Then, on a periodic basis, for example daily, changes fed to the CASI 164 on a periodic basis are matched up with batch files passed from the subscriber data system 106 of the wireless carrier 102 to the CASI 164 to ensure that the CASI 164 has the latest and most complete information associated with subscribers to integrated services of both the wireline carrier 152 and the wireless carrier 102.

At block 235, the bundle integrity manager (BIM) 158 ensures services integrity between the wireless carrier 102 and the wireline carrier 152. According to embodiments of the present invention, the BIM 158 obtains ordering information from the wireline carrier 152 and the wireless carrier 102 including information loaded into the CASI 164, described above, to ensure that both systems 102, 152 are operating on the same subscriber data. If a services change is made in one of the wireless carrier 102 or the wireline carrier 152 that is not passed through to the other carrier, the BIM 158 detects the problem and notifies all affected parties. For example, if a subscriber contacts the wireless ordering platform 104 and cancels her subscription to the minute sharing plan described by way of example above, and data associated with the change order is not passed through to the wireline ordering platform 154, the BIM 158 will detect the change and compare the change to data contained in the CASI 164 to determine that the change order placed by the subscriber must also be processed by the wireline carrier 152. Consequently, the BIM 158 will send a notification to the wireline ordering platform 154 to notify the wireline carrier 152 of the change order made by the subscriber via the wireless ordering platform 104.

At block 240, any services changes or services orders made by the subscriber via the wireless carrier 102 or the wireline carrier 152 are reported to the subscriber via one fulfillment notification. That is, the subscriber will not receive letters or notifications from both the wireless carrier 102 and the wireline carrier 152 regarding services orders or services changes made by the subscriber. At block 245, any services inquiries made by the subscriber regarding the integrated wireless/wireline services ordered by the subscriber may be made through a single services portal 196 through either the wireless carrier 102 or the wireline carrier 152. That is, if the subscriber utilizes a services portal 196 such as a web-based information page of the wireline carrier 152, the subscriber may obtain services information on the integrated wireless/wireline services ordered by the subscriber according to embodiments of the present invention. Conversely, if the subscriber selects a services portal 196 such as a web-based page of the wireless carrier 102, the subscriber may obtain information regarding the integrated wireless/wireline services subscribed to by the subscriber according to embodiments of the present invention. The method 200 ends at block 295.

Figure 3:
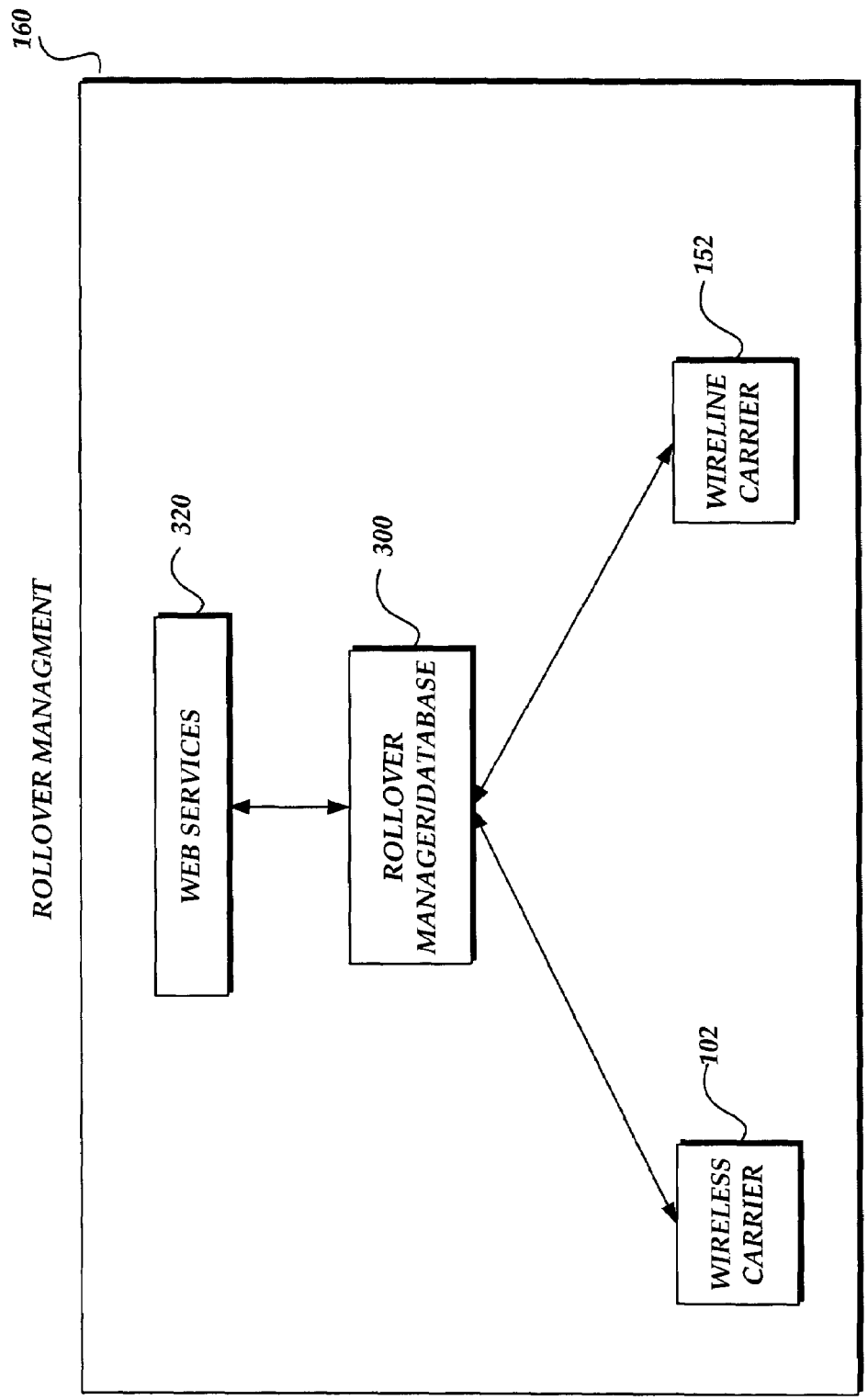
FIG. 3 is a simplified block diagram illustrating components of a rollover management system according to embodiments of the present invention.

FIG. 3 is a simplified block diagram illustrating components of a rollover management system according to embodiments of the present invention. As briefly described above with reference to FIG. 1, a rollover management system 160 is provided for managing services that are not used in a given services period which may be "rolled over" to a subsequent services usage period. For example, if the subscriber subscribes to a calling plan giving the subscriber 1000 anytime minutes per month and the subscriber subsequently subscribes minute sharing plan, described above by way of example, the rollover management system 160 ensures a proper accounting of rollover units (e.g., minutes).

Referring to FIG. 3, a rollover manager/database 300 is illustrated. According to embodiments of the present invention, the rollover manager/database 300 includes general purpose computing and memory functionality and software programming operable for collecting information from both the wireless carrier 102 and the wireline carrier 152 regarding subscriber services usage in order to properly account for rollover units available to the subscriber during any given usage period. On the back end of the rollover management system, the wireless carrier 102 passes through to the rollover manager 300 usage history for a given wireless subscriber to ensure the rollover manager 300 has a proper accounting of the number of units of services usage utilized by the subscriber. The wireline carrier 152 passes CDR rating data associated with local and long distance wireline telephone calls requiring units of services usage (e.g., requiring minutes of call usage from the subscriber's calling plan).

According to embodiments of the present invention, a rollover matrix is prepared and maintained by the rollover manager 300 containing rollover units data for a set period of time, such as rollover minutes for every month of one year. The data maintained in the rollover matrix is utilized for calculation, display and billing of rollover minutes. The rollover manager 300 transfers the rollover matrix between the wireless carrier 102 and the wireline carrier 152 to allow both carriers to synchronize information associated with rollover minutes.

On the front end of the rollover management system 160 is provided a web services platform 320. According to embodiments of the present invention, rollover information prepared and maintained by the rollover manager 300 is published via the web services platform 320 to allow subscribers and carrier administrators to review rollover data associated with a given subscriber account.

The rollover management system 160 also tracks unbilled usage data between the wireless carrier 102 and the wireline carrier 152. As is understood by those skilled in the art, unbilled usage includes subscriber services usage that has been expended, but has not yet been applied to a subscriber bill. For example, if the subscriber's last bill provided information through the 15th day of the present month, services usage by the subscriber after the 15th day of the present month will not be billed to the subscriber until the 15th day of the next month. Consequently, the subscriber may not have an accurate understanding of the number of units of usage, for example minutes of usage, presently available to the subscriber. The rollover management system 160 tracks unbilled subscriber usage and makes that information available to the subscriber via the web services platform 320. The unbilled subscriber usage information may also be made available to customer representatives at a sales and customer support center or the like.

According to embodiments of the present invention, if a subscriber attempts to order the integrated wireline/wireless billing management plan according to embodiments of the present invention via the wireless ordering platform 104 or the wireline ordering platform 154, the subscriber may place the order through an electronic ordering system through either the wireless carrier 102 or the wireline carrier 152. Utilizing a web-based graphical user interface, the subscriber can check for the eligibility of the wireline carrier 152 for providing the desired integrated wireless/wireline calling plan. If the carrier 152 is eligible for providing the desired service, the subscriber may place the order through the wireless carrier 102, and the ordering information is passed through to the wireline carrier 152 via the API's 198 described herein.

Figure 4:
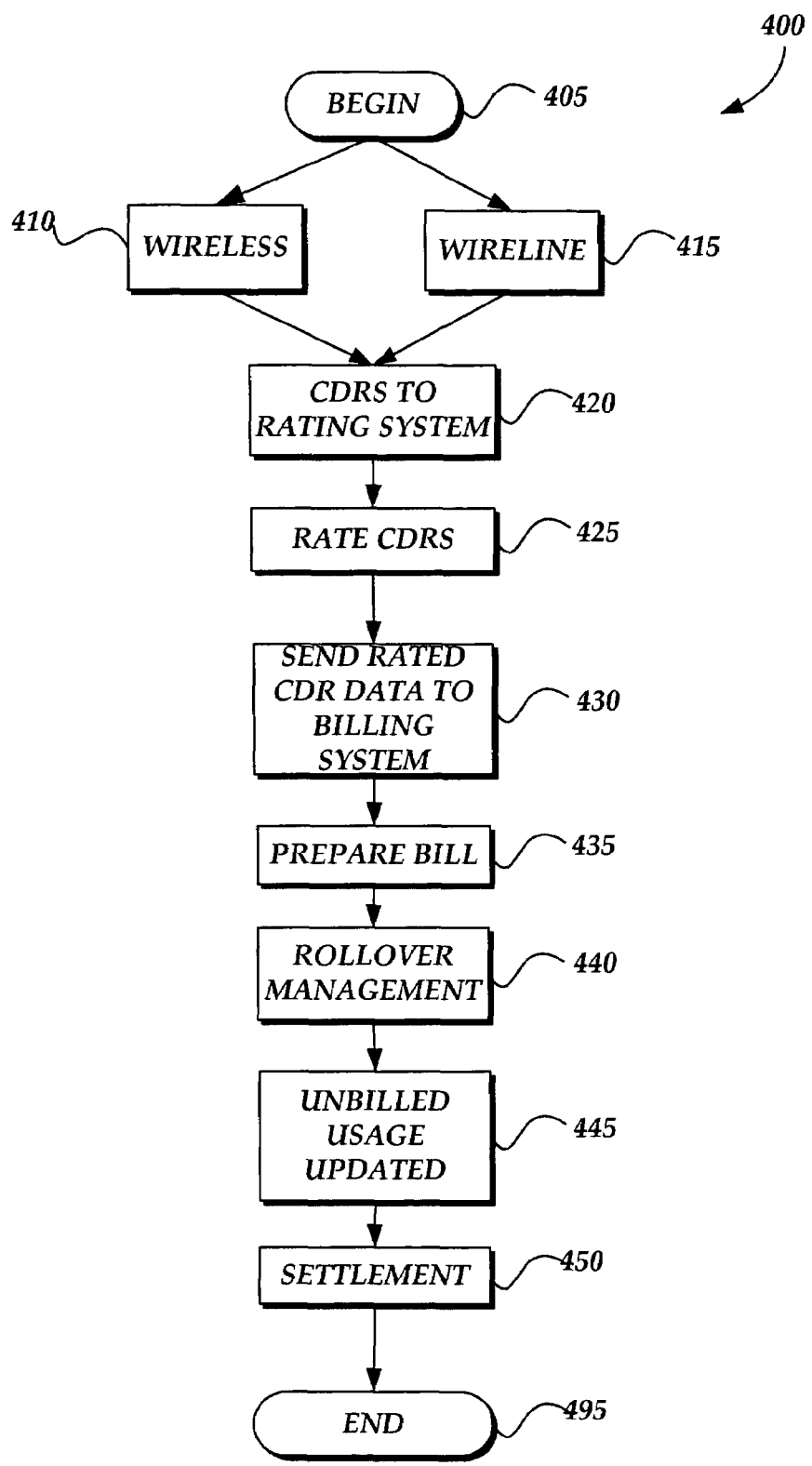
FIG. 4 is a flow diagram showing an illustrative routine for integrating billing management services to allow subscribers to share calling plans between local and long-distance wireline services and wireless services.

Having described the ordering of an integrated wireless/wireline billing system (e.g., minute sharing plan) above with reference to FIGS. 2 and 3, it is advantageous to described the processing of billing associated with calls made via the wireless carrier 102 and the wireline 152 according to the integrated wireless/wireline billing system. FIG. 4 is a flow diagram showing an illustrative routine for integrating billing management services to allow subscribers to share calling plans between local and long distance wireline services and wireless services. The method 400 begins at start block 405 and proceeds to blocks 410 and 415. At block 410, wireless calls are made and received by the subscriber via the subscribers' wireless service through the wireless carrier 102. At block 415, wireline calls are made by the subscriber using the subscriber's long distance telephone service through the wireline carrier 152. For purposes of example only considered that the subscriber has previously ordered a minute sharing plan whereby the subscriber receives 1000 anytime minutes per month which may be used both wireless and wireline long distance calls.

At block 420, call data records 124 associated with wireless calls made or received by the subscriber are received at the wireless billing system 108 of the wireless carrier 102. The CDRs 124 are passed by the wireless billing system 108 to the CDR rating platform 170 of the wireline carrier 152. As should be understood by those skilled in the art, telephone calls made from and received by the subscriber's wireless telephone unit 110 may be tagged in accordance with the subscriber's integrated wireless/wireline calling plan so that call data records associated with those calls will be transferred to the CDR rating platform 170. The CDRs 124 may be passed to the CDR rating platform 170 one record at a time, or the CDRs may be sent to the CDR rating platform 170 in batch mode on a periodic basis.

At block 425, the CDR rating platform 170 rates the CDRs 124 received from the wireless carrier 102 to determine whether calls associated with the CDRs 124 may be charged to the subscriber's calling plan or to determine whether the calls should have any charge at all. In the first instance, the CDR rating platform determines whether a given CDR is related to a call requiring no charge. For example, if the subscriber's calling plan stipulates that all mobile-to-mobile calls result in no charge, a determination is made as to whether a given CDR is the result of a mobile-to-mobile call. For another example, if the subscriber's calling plan stipulates that all evening and weekend calls are free, a determination is made at the CDR rating platform 170 that all CDRs for calls made or received during the evenings and weekends receive no charge. In addition to the CDRs 124 received from the wireless carrier 102, CDRs associated with use of the wireline local and long distance services of the wireline carrier 152 are passed to the CDR rating platform 170 for rating with the CDRs 124 from the wireless carrier 102.

If the CDR rating platform 170 has determined that a CDR is associated with a call requiring a charge, a determination is made as to how many units of call usage, for example minutes of call usage, are remaining in the subscriber's account. If the subscriber has remaining minutes to cover a call associated with a particular CDR, that CDR is rated against the remaining minutes left in the subscriber's account. If the subscriber's account does not have remaining minutes, a determination is made via the rollover management system 160 as to whether the subscriber's account has access to rollover minutes rolled over from a previous billing period. If rollover minutes are available, the call associated with the given CDR is rated against the available rollover minutes. If no additional minutes are available either in the subscriber's minutes account or in the subscriber's rollover minutes account, the CDR platform 170 determines what charge is related to the units of call usage. That is, a determination is made as to what charge is associated with calls made that exceed the number of minutes per month ordered by the subscriber.

At block 430, all rated CDR data is passed from the CDR rating platform 170 to the wireline billing system 168. At block 435, the wireline billing system totals all charges associated with the subscriber's account including charges for individual CDRs exceeding the number of minutes subscribed to by the subscriber. Additional accounting data is applied to the charges including local, state, and federal taxation, and a bill 172 is generated. As described above, the bill 172 may be in the form of a standard paper bill that may be mailed to the subscriber, or the bill may be in the form of an electronic bill 10 that may be published to the subscriber via an Internet-based web page.

At block 440, the rollover management system 160 determines whether any minutes of usage are still available at the end of a given billing period. If so, the rollover management system 160 applies the remaining minutes to the rollover matrix, as required by the subscribers calling plan. At block 445, unbilled usage data is updated, as described above with reference to FIG. 3.

At block 450, the wireline billing system prepares settlement data for apportioning revenue between the wireless carrier 102 and the wireline carrier 152. For example, consider that a charge of $30.00 per month is assessed to the subscriber for the integrated wireless/wireline minutes sharing calling plan. Consider that the wireless carrier 102 has a set fee of $10.00 per month. Consider that the wireline carrier 152 has a set fee of $6.00 per month. After subtracting the set fees total of $16.00 per month from the $30.00 per month calling plan fee, the remaining $14.00 per month may be apportioned between the wireless carrier 102 and the wireline carrier 152 based on the amount of call usage associated with each carrier. As should be understood, the foregoing settlement discussion is by way of example only and is not restrictive of the invention as claimed herein. That is, revenue apportionment may be accomplished according to any agreement between the two or more services providers utilizing embodiments of the present invention for billing and services management. For example, the set charges due to each carrier in the above example may be handled on the backend prior to preparation of settlement data, whereby settlement data is only calculated based on customer services usage. After revenue associated with a given usage period is settled between the wireless carrier 102 and wireline 152, the method ends at block 495.

According to an alternative embodiment, the CDRs 124 are passed from the wireline carrier 152 to the wireless billing system/CDR rating platform 108 of the wireless carrier 102. According to this alternative embodiment, the CDR rating platform of the wireless billing system 108 performs CDR rating, as described above for the CDR rating platform 170. Once all CDRs 124 are rated by the wireless billing system/CDR rating platform 108, the rated CDR data is passed back to the wireline billing system 168 for processing as described above with reference to FIG. 4. According to another alternative the CDRs for each carrier may be rated at each of their respective CDR rating platforms 108 and 170 and the rated data may then be passed to a single billing system at either of the two carriers for generation of a single periodic bill as described herein. According to yet another embodiment, the CDRs for each carrier may be sent to a third party CDR rating platform and billing system operated separately from either of the carriers 102, 152 where CDRs are rated and where billing is performed on behalf of the carriers 102, 152. Likewise, other billing and services management components and systems, such as the settlement component 192 and the rollover management system 160, may be operated separately from either of the carriers 102, 152, described herein. That is, such components and systems may be operated by third parties who offer services such as revenue settlement and rollover management to carriers such as the carriers 102 and 152.

As described herein, an integrated telecommunications billing and services management system is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method of integrating billing and services management, and revenue sharing between a wireless telecommunications carrier and a disparate wireline telecommunications carrier executed on one or more computers, comprising;
   provisioning by a computer a call unit sharing plan allowing a user to charge units of wireless usage at a wireless carrier and units of wireline usage at a disparate wireline carrier to one calling plan;
   receiving wireless usage at the wireless carrier;
   receiving wireline usage at a wireline usage rating platform;
   routing the wireless usage to the wireline usage rating platform;
   receiving a rollover matrix indicating a number of units of call usage that are available for rolling over to a subsequent usage period;
   rolling over to the subsequent usage period the number of units of call usage that are available for rolling over;
   when any of the wireless or wireline usage requires a billing charge, charging any of the wireless or wireline usage to the call unit sharing plan; and
   settling a revenue associated with the call unit sharing plan between the wireless carrier and the wireline carrier in a single billing cycle by apportioning an amount of the revenue related to wireless services during the single billing cycle to the wireless carrier and apportioning an amount of the revenue related to wireline services during the single billing cycle associated to the wireline carrier.

2. The method of claim 1, including preparing a single periodic bill showing charges to the call unit sharing plan related to the wireless and wireline usage charged to the call unit sharing plan.

3. The method of claim 1, prior to charging any of the wireless or wireline usage to the call unit sharing plan, rating the wireless and wireline usage at the wireline usage rating platform to determine whether any of the wireless or wireline usage must be charged to the call unit sharing plan.

4. The method of claim 3, further comprising determining whether any of the wireless or wireline usage is related to calling types requiring no charge.

5. The method of claim 4, whereby when any of the wireless or wireline usage is associated with calling types requiring no charge, designating the any of the wireless or wireline usage requiring no charge.

6. The method of claim 4, whereby at least some of the wireless usage requires no charge because a wireless call related to the at least some of the wireless usage requiring no charge was made during a free call period or a different rate call period.

7. The method of claim 4, whereby at least some of the wireless usage requires no charge because a wireless call related to the at least some of the wireless usage requiring no charge was made from a wireless phone of the user to a wireline home phone of the user.

8. A method for synchronizing services on two disparate services ordering platforms between a first telecommunications services carrier and a second disparate telecommunications services carrier executed on one or more computers, the method comprising:
    receiving a services order at a first services ordering platform of the first telecommunications services carrier requiring services changes that affect the second disparate telecommunications services carrier;
    notifying the second disparate telecommunications services carrier to provide the services order to the second telecommunications services carrier;
    on a periodic basis, updating a customer affiliate subscriber information database in a businesses services platform the services changes that affect the second disparate telecommunications services carrier; and
    on a periodic basis, synchronizing by a computer batch files passed from a subscriber data system of the first telecommunications services carrier to the customer affiliate subscriber information database to ensure the customer affiliate subscriber information database has complete information related to a subscriber to the first telecommunications services carrier and the second disparate telecommunications services carrier.

9. The method of claim 8, further comprising ensuring that subscriber services at the first telecommunications services carrier are synchronized with subscriber services at the second telecommunications services carrier for any subscriber services affecting both the first and second disparate telecommunications services carriers.

10. The method of claim 9, further comprising ensuring that no subscriber services changes are made at the first telecommunications services carrier affecting the second disparate telecommunications services carrier if a responsive services change is not made at the second disparate telecommunications services carrier.

11. The method of claim 9, further comprising when a services change is made at the first telecommunications services carrier affecting the second telecommunications services carrier without making a required responsive services change at the second disparate telecommunications services carrier, notifying the second disparate telecommunications carrier of the services change at the first telecommunications services carrier.

12. The method of claim 8, further comprising sending an integrated fulfillment notification to any subscriber making services changes with either the first telecommunications services carrier or the second disparate telecommunications services carrier where the services changes affect both the first telecommunications services carrier and the second disparate telecommunications services carrier.

13. A system for integrating billing and services management and revenue sharing between a wireless telecommunications carrier and a disparate wireline telecommunications carrier, comprising;
    a wireless carrier billing system executing on a computer operative
        to receive wireless call usage related to wireless calls made via the wireless carrier;
        to route the wireless call usage to a call usage rating platform at the wireline carrier;
    the call usage rating platform at the wireline carrier operative
        to receive wireline call usage related to wireline calls made via the wireline carrier;
        to charge any of the wireless or wireline call usage to a subscriber call unit sharing plan when any of the wireless or wireline call usage requires a billing charge;
        to route rated call usage information for all wireless and wireline call usage requiring billing under the subscriber call unit sharing plan to a wireline carrier billing system;
    a rollover management system operative
        to generate a rollover matrix indicating a number of units of call usage that are available for rolling over to a subsequent usage period;
        to roll over to the subsequent usage period the number of units of call usage that are available for rolling over and
    the wireline carrier billing system operative
        to prepare a single periodic bill showing charges to the subscriber call unit sharing plan related to the wireless and wireline call usage charged to the call unit sharing plan;
        to indicate the number of units of call usage that have been rolled over to the subsequent usage period; and
        to settle a revenue associated with the single periodic bill between the wireless carrier and the wireline carrier by apportioning an amount of the revenue related to wireless services during a billing cycle associated with the single periodic bill to the wireless carrier and apportioning an amount of the revenue related to wireline services during the billing cycle associated with the single periodic bill to the wireline carrier.

14. A method of integrating billing management and revenue sharing between a wireless telecommunications carrier and a disparate wireline telecommunications carrier executed on one or more computers, comprising;
    provisioning a call unit sharing plan allowing a user to charge units of wireless usage at a wireless carrier and units of wireline usage at a disparate wireline carrier to one calling plan;

receiving wireless usage at the wireless carrier;
receiving wireline usage at a wireline usage rating platform;
routing the wireless usage to the wireline usage rating platform;
rating by a computer the wireless and wireline usage at the wireline usage rating platform to determine whether any of the wireless or wireline usage must be charged to the call unit sharing plan;
when any of the wireless or wireline usage requires a billing charge, charging the any of the wireless or wireline usage to the call unit sharing plan;
receiving a rollover matrix indicating a number of units of call usage that are available for rolling over to a subsequent usage period;
rolling over to the subsequent usage period the number of units of call usage that are available for rolling over;
preparing a single periodic bill showing charges to the call unit sharing plan related to the wireless and wireline usage charged to the call unit sharing plan and the number of units of call usage that have been rolled over to the subsequent usage period;
settling a revenue associated with the single periodic bill between the wireless carrier and the wireline carrier by apportioning an amount of the revenue associated with wireless services during a billing cycle associated with the single periodic bill to the wireless carrier; and
apportioning an amount of the revenue associated with wireline services during the billing cycle related to the single periodic bill to the wireline carrier.

15. The method of claim 14, further comprising when any of the wireless usage comprises a wireless call from a wireless phone of the user to a wireline home phone of the user, designating the wireless or wireline usage related to the wireless call as requiring no charge.

16. A method of integrating billing management between a plurality of carriers' disparate telecommunications services systems executed on one or more computers, comprising:
receiving first call usage associated with calls transacted via a first services system;
receiving second call usage related to calls transacted via a second services system;
routing the first call usage and the second call usage to one or more call usage rating platforms;
determining in a computer billing information related to each of the first and second call usages;
routing billing information related to each of the first and second call usages to a billing system;
receiving a rollover matrix indicating a number of units of call usage that are available for rolling over to a subsequent usage period;
rolling over to the subsequent usage period the number of units of call usage that are available for rolling over; and
preparing a single periodic bill showing charges related to the first and second call usages and the number of units of call usage that have been rolled over to the subsequent usage period.

17. The method of claim 16, whereby routing the first call usage and the second call usage to the one or more call usage rating platforms includes routing the first call usage to a first call usage rating platform and routing the second call usage to a second call usage rating platform.

18. The method of claim 16, whereby routing the first call usage and the second call usage to the one or more call usage rating platforms includes routing the first call usage and the second call usage to a single call usage rating platform at one of the first or second services systems.

19. A method of integrating billing and services management between a wireless telecommunications carrier and a disparate wireline telecommunications carrier executed on one or more computers, comprising:
provisioning by a computer a call unit sharing plan allowing a user to charge units of wireless usage at a wireless carrier and units of wireline usage at a disparate wireline carrier to one calling plan;
receiving wireless usage at the wireless carrier;
receiving wireline usage at a wireline usage rating platform;
receiving the wireless usage at the wireline usage rating platform;
receiving a rollover matrix indicating a number of units of call usage that are available for rolling over to a subsequent usage period;
rolling over to the subsequent usage period the number of units of call usage that are available for rolling over; and
when any of the wireless or wireline usage requires a billing charge, charging any of the wireless or wireline usage to the call unit sharing plan.

20. The method of claim 19, further comprising preparing a single periodic bill showing charges to the call unit sharing plan related to the wireless and wireline usage charged to the call unit sharing plan.

21. The method of claim 19, further comprising prior to charging any of the wireless or wireline usage to the call unit sharing plan:
rating each wireless and wireline usage at the wireline usage rating platform to determine whether any usage must be charged to the call unit sharing plan;
determining whether any wireless usage or wireline usage is related to calling types requiring no charge; and
in response to any wireless usage or wireline usage being related to calling types requiring no charge, designating the any wireless usage or wireline usage requiring no charge as requiring no charge.

22. A method of integrating billing and services management between a wireless telecommunications carrier and a disparate wireline telecommunications carrier executed on one or more computers, comprising:
provisioning by computer a call unit sharing plan allowing a user to charge units of wireless usage at a wireless carrier and units of wireline usage at a disparate wireline carrier to one calling plan;
receiving wireline call usage at a wireline rating platform;
receiving wireless call usage at a wireline rating platform;
when any of the wireless or wireline call usage requires a billing charge, charging the any of the wireless or wireline call usage requiring a billing charge to the call unit sharing plan;
receiving a rollover matrix indicating a number of units of call usage that are available for rolling over to a subsequent usage period;
rolling over to the subsequent usage period the number of units of call usage that are available for rolling over and preparing a single periodic bill showing charges to the call unit sharing plan related to the wireless and wireline call usage charged to the call unit sharing plan and the number of units of call usage that have been rolled over to the subsequent usage period.

* * * * *